March 12, 1963

E. JONES 3,080,977

DRIER FITTING AND ASSEMBLY

Filed May 6, 1960

INVENTOR.
EVAN JONES
BY
Cromwell, Greist
and Warden
ATTORNEYS.

March 12, 1963  E. JONES  3,080,977
DRIER FITTING AND ASSEMBLY
Filed May 6, 1960
2 Sheets-Sheet 2

INVENTOR.
EVAN JONES
BY
Cromwell, Greist and Warden
ATTORNEYS.

United States Patent Office 3,080,977
Patented Mar. 12, 1963

3,080,977
DRIER FITTING AND ASSEMBLY
Evan Jones, Evanston, Ill., assignor to Henry Valve Company, Melrose Park, Ill., a corporation of Illinois
Filed May 6, 1960, Ser. No. 27,357
2 Claims. (Cl. 210—232)

The present invention relates to a new and improved fitting for use in connecting a drier unit in a fluid flow line, such as a refrigerant flow line, and a new and improved drier assembly including the fitting as a part thereof. More specifically, the present invention is directed to a new and improved form of refrigerant drier fitting and drier assembly of the general T-flow type which utilizes a unique baffle and refrigerant flow control assembly in directing refrigerant flow through a drier unit forming a part of the assembly.

T fittings for connection in refrigerant flow lines and including means for detachably mounting a drier unit thereon are in general use in many different types of refrigeration systems. The T fitting generally includes a pair of co-axial passages in communication with an intermediate vertical passage which in turn communicates with a detachable drier unit subject to ready replacement upon exhaustion thereof without the necessity of disconnecting the fitting from the flow line. Various types of flow control means have been mounted in the intermediate passage to divert the refrigerant through the drier unit and eventually direct the dried refrigerant through the outlet passage of the fitting back into the flow line. The various flow control means used have in most instances been permanently secured in the intermediate passage. Due to space restrictions as a result of the relatively small size of the fitting, assembly costs are high as considerable care must be exercised in properly permanently fixing the flow control means therein. The means used ordinarily include ports and the like which must be properly aligned with the co-axial passages of the fitting to assure proper direction of flow of refrigerant therethrough and through the drier unit. In the instance where the flow control means are merely inserted in the intermediate passage without permanent mounting therein, the problem of proper port alignment is indeed serious and, accordingly, the industry has generally relied upon permanent fixing of the control means in the fitting.

It is an object of the present invention to provide a new and improved fitting for use in connecting a drier unit in a fluid flow line, the fitting including therein new and improved refrigerant flow control means of relatively inexpensive design and subject to ready infallible installation by unskilled persons.

A further object is to provide a new and improved drier assembly which includes as a part thereof flow control and diverting means of unique design and arrangement capable of providing adequate refrigerant flow to the drier unit of the assembly for efficient utilization thereof.

Still a further object is to provide a new and improved fitting for use in connecting a drier unit in a fluid flow line, the fitting including therein a fixed baffle of unique design and arrangement and a removable flow control tube-like member, the tube-like member being of such design that the same can be readily inserted blind within the fitting without resorting to special port alignment installation procedures.

Other objects not specifically set forth will become apparent from the following detailed description of the present invention made in conjunction with the accompanying drawings wherein.

Figure 1:
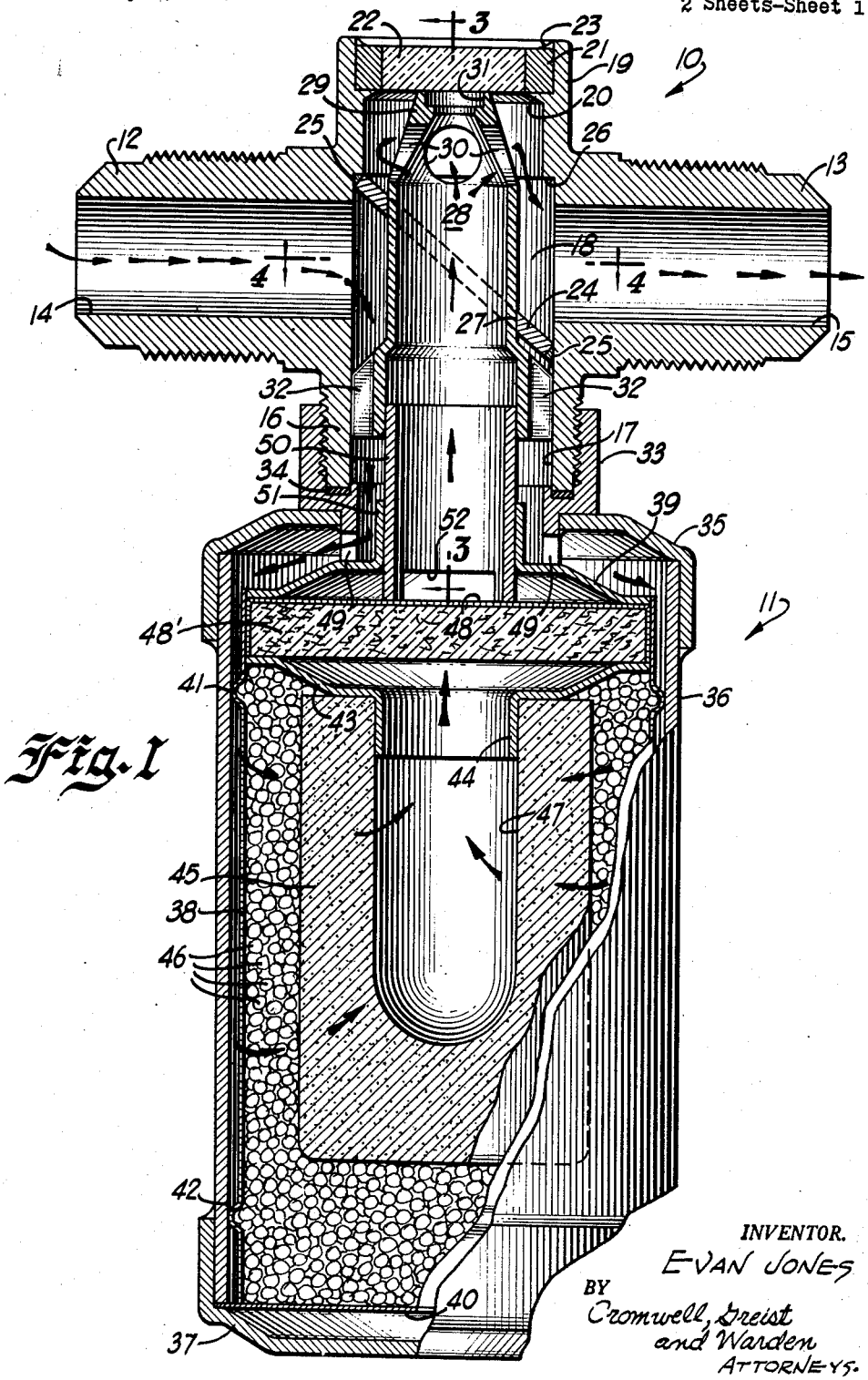
FIG. 1 is a fragmentary vertical section of the drier assembly of the present invention illustrating the various design improvements incorporated therein.
Figure 2:
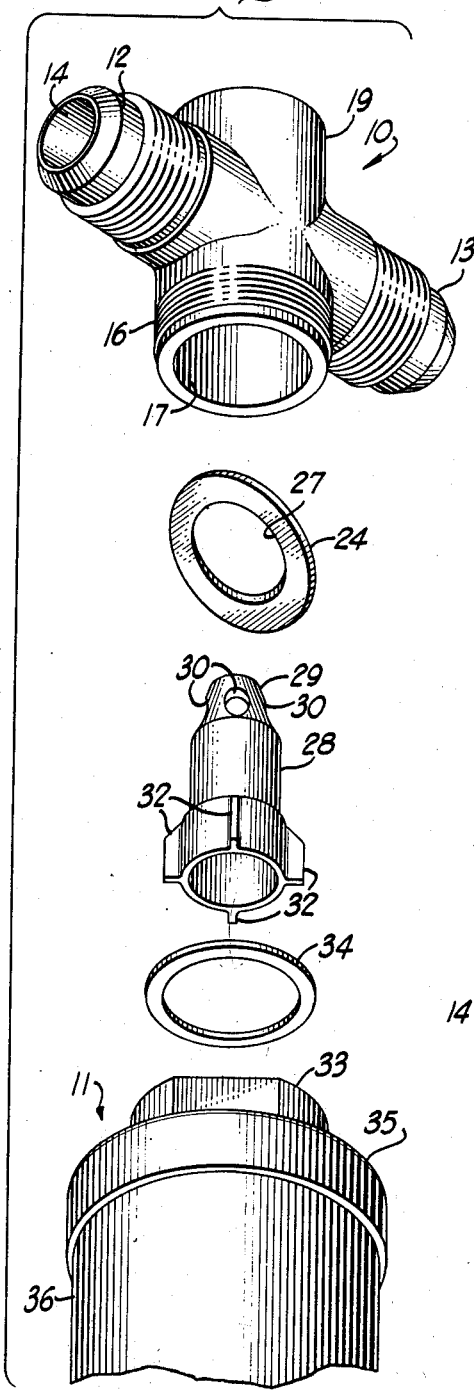
FIG. 2 is a fragmentary exploded perspective of the drier assembly illustrating drier unit detachment therefrom and the individual members of the unique flow control means mounted in the fitting.
Figure 3:
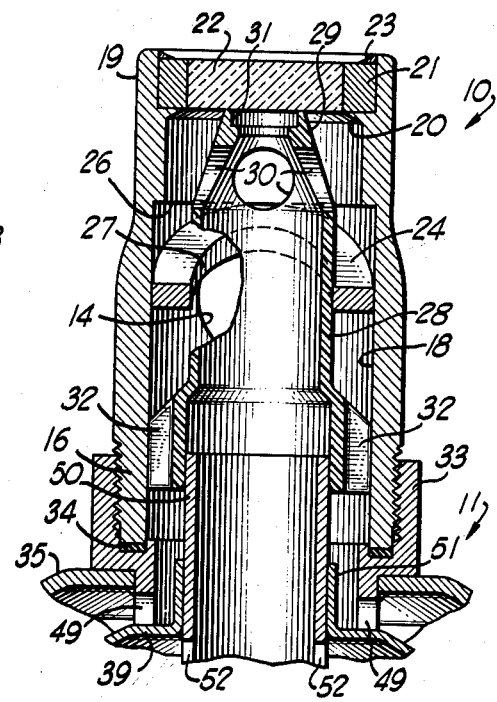
FIG. 3 is a fragmentary section of the fitting portion of the assembly taken generally along line 3—3 in FIG. 1.
Figure 4:
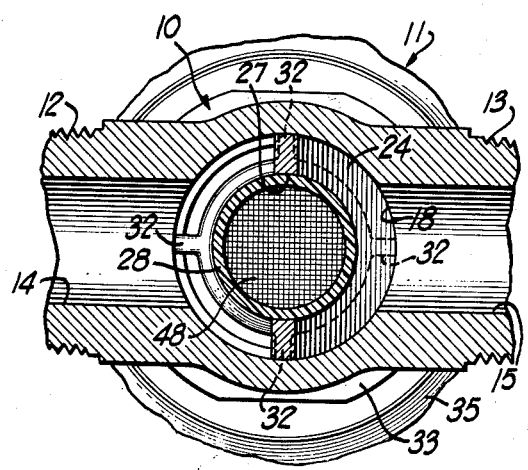
FIG. 4 is a fragmentary section of a portion of the fitting taken generally along line 4—4 in FIG. 1.

FIG. 1 of the drawings illustrates the drier assembly of the present invention as including a T fitting 10 and a dier unit 11 removably attached thereto. The fitting 10 includes a body portion provided with oppositely directed, axially extending threaded nipples 12 and 13 which internally thereof respectively define flow passages 14 and 15. The nipples 12 and 13 are used to connect the assembly in a refrigerant flow line in any suitable manner. A vertically downwardly directed, externally threaded nipple 16 is formed integral with the body portion and defines internally thereof a flow passage 17 which intersects the flow passages 14 and 15 at any suitable angle, such as right angles as illustrated, and defines between the passages 14 and 15 a fluid flow chamber 18. The body portion 10 is further provided with a boss 19 the interior of which is hollow and in communication with the chamber 18. The boss 19 internally thereof is provided with a radially inwardly projecting, integrally formed shoulder 20 on which a window assembly is seated. This assembly includes a metallic mounting ring 21 and a central transparent window 22 formed from glass or the like fused to the ring 21 with the entire assembly being permanently mounted by a weld 23.

Referring to FIGS. 1-4, the chamber 18 has received therein a centrally apertured baffle 24 which is in the form of an eliptical ring. The baffle 24 is angled across the chamber 18 from an area radially offset relative to the passage 14 and to an area oppositely radially offset relative to the passage 15 as best shown in FIG. 1. The baffle 24 is preferably permanently mounted in the chamber 18 by a solder ring 25. The upper edge portion of the baffle 24 is seated against a portion of a shoulder 26 formed in the chamber 18 above the passage 14 with the solder ring 25 holding the baffle in place. The lower edge portion of the baffle 24 is secured by the solder ring 25 in an area immediately below the passage 15. Thus the baffle 24 is arranged diagonally across the chamber 18 in a manner that if the baffle were imperforate, the passages 14 and 15 would be closed off from one another.

However, as previously described, the baffle 24 is centrally apertured with the aperture being identified by the numeral 27. In the embodiment illustrated, the outer surface of the baffle 24 is perpendicular to the opposite end faces thereof but the inner surface of the baffle 24 defining the aperture 27 lies in a vertical cylindrical plane as best shown in FIG. 1. This design permits insertion of a tubular fluid flow tube 28 through the aperture 27 of the baffle 24 vertically upwardly through the chamber 18 into upper end engagement with the window 22. Any suitable design may be used to obtain a seal with the chamber 18 and tube 28 and depending on the procedure followed in forming the baffle.

The flow tube 28 at the upper end thereof is provided with a cone-shaped portion 29 having a plurality of circumferentially spaced apertures 30 therethrough. The top of the cone-shaped portion 29 is provided with a central aperture 31 to permit ready observance of refrigerant flow through the window 22 as will better be described. The cone-shaped portion 29 in its mounted position in engagement with the window 22 extends well above the baffle 24 thus providing for flow of refrigerant through the tube 28 and apertures 30 into the passage 15.

The central portion of the flow tube 28 is of an outer diameter which is substantially less than the diameter of the chamber 18 to permit refrigerant flow thereabout as controlled by the baffle 24. The base of the flow tube 28 is provided with a plurality of integrally formed, circumferentially spaced vane-like ribs or fins 32 which engage the passage 17 and cooperate with the baffle 24 to center and rigidly position the flow tube 28 in the chamber 18. Refrigerant may readily flow between the fins 32 downwardly through the passage 17 about the flow tube 28 as controlled by the baffle 24. The flow tube 28 may be removably mounted in the chamber 18 and the vertical inner surface of the baffle 24 defining the central aperture 27 thereof conforms to the outer vertical cylindrical surface of the flow tube 28 to provide for a close fit therebetween to prevent leakage at this area through the baffle 24. The tube 28 may be molded from any suitable plastic material such as nylon.

Referring to FIG. 1, the drier unit 11 includes a collar-type fitting 33 which at the upper end is internally threaded for engagement with the external threads of the nipple 16. A gasket 34 is engaged between the collar 33 and nipple 16 to seal the connection thereof. An end cap 35 is suitably fixed to the collar 33 and encloses the upper end of a shell 36, the bottom end of the shell being enclosed by an end cap 37. Received within the shell 36 is a drier cartridge formed from a perforate tubular portion 38 closed at its upper end by an imperforate outlet plate 39 and closed at its lower end by an imperforate plate 40 which is suitably clamped between the end cap 37 and the shell 36. The perforate tube 38 is expanded at 41 and 42 to provide rib-like projections for central spacing of the drier cartridge within the shell 36 to permit refrigerant flow thereabout and through the perforations in the tube 38 into the cartridge.

Internally of the cartridge an imperforate outlet plate 43 is mounted and is provided with a centrally depending flange 44 which carries thereabout the upper end of a molded drier-filter block 45 formed from any suitable porous desiccant material. Discrete particles of dehydrant material 46 are solidly packed around the outer surface of the block 45 to aid in supporting the same in proper position within the cartridge. The block 45 includes a central fluid collecting passage 47 which is closed at the lower end and in which is received the depending flange 44 of the outlet plate 43. An inverted cup-shaped outlet screen 48 is mounted above the outlet plate 43 between the same and the outlet plate 39. A filtering pad 48' of glass fiber or the like is mounted in the screen 48. The lower end of the collar 33 engages the outlet plate 39 and aids in maintaining the cartridge unit in proper position within the shell 36, this lower end being provided with a plurality of circumferentially spaced apertures 49 through which refrigerant flows.

The drier assembly is completed with the provision of a connecting tube 50 which is in the form of an extension and which is received in an upwardly projecting tubular flange portion 51 of the outlet plate 39. The lower end of the connecting tube 50 is in abutment with the central portion of the screen 48 and functions to support this central portion against damaging displacement in response to the force of refrigerant flow therethrough. The lower end of the connecting tube 50 is provided with a plurality of groove-like apertures 52 permitting refrigerant flow into the center of the tube from areas beyond the tube but within the cartridge unit. The upper end of the connecting tube 50 is received within the lower end of the flow tube 28 and there is preferably a slight friction fit between these tubes with the connecting tube 50 functioning to aid in supporting the flow tube 28 in its operative position within the fitting 10 and in abutment with the inner surface of the window 22.

Refrigerant flow through the assembly is illustrated in FIG. 1. Refrigerant is introduced into the fitting 10 through the passage 14 and is prevented by the lower surface of the baffle 24 and the outer surface of the flow tube 28 from by-passing the drier unit 11 and flowing directly into the passage 15 of the fitting 10. Refrigerant flows downwardly around the flow tube 28 and the telescoped connecting tube 50 through the collar 33 and the apertures 49 therein into the shell 36 of the drier unit 11. Refrigerant flows into the cartridge unit through the apertures in the perforate shell 38 and intimately contacts the particles of dehydrant 46 therein. The refrigerant then flows through the pores of the block 45, is filtered and subject to further dehydration, collects in the passage 47 of the block, flows upwardly through the flange 44 of the outlet plate 43 and through the pad 48' and screen 48 into the connecting tube 50. Refrigerant flows upwardly through the connecting tube directly into the flow tube 28 and upwardly into the cone-shaped top portion 29 thereof. Liquid refrigerant flow is readily observable through the window 22 and the aligned aperture 31 around the top of the tube and this flow continues through the apertures 30 downwardly into the chamber 18 against the upper surface of the baffle 24 and around the outer surface of the flow tube 28 into the passage 15 by which it is returned into the refrigerant flow line. The aperture 31 is designed to mount therein a moisture indication means of any suitable type which would be readily observable through the window 22.

By reason of the unique shape of the baffle 24, the same may be readily inserted and fixed within the chamber 28. The flow tube 28 is merely inserted through the aperture 27 of the baffle 24 and no special positioning or port alignment of the flow tube 28 is necessary. In other words, the flow tube 28 upon insertion within the chamber 18 may be rotated to any extent desired as this tube does not include any ports which must be aligned with any of the passages of the fitting.

Obviously certain modifications and variations of the invention as hereinbefore set forth may be made without departing from the spirit and scope thereof, and therefore only such limitations should be imposed as are indicated in the appended claims.

I claim:

1. A drier assembly comprising, in combination, a drier unit and a fitting, said fitting including a body portion provided with three interconnected passages of which two are used in connecting said fitting in a fluid flow line with the third being vertically arranged and removably connected with said drier unit, an elliptical planar baffle fixed in said third passage in angled relation thereacross from an area radially offset relative to one of said two passages to an area oppositely radially offset relative to the other of said two passages, means circumferentially sealing said baffle to the inner surface of said third passage, said baffle including a central elliptical aperture with the edge defining the same lying in a vertical cylindrical plane, and an annular open ended tube-like member vertically removably received in said third passage spaced from the inner surface thereof and inserted through the aperture of said baffle in outer surface frictional sealing engagement with said edge, said baffle diverting flow of fluid from said one passage into said third passage about said tube-like member, said tube-like member being connected with said drier unit with the interior of said tube-like member providing for fluid flow from said drier unit through said baffle and into said other passage, said tube-like member below said baffle being provided with vane-like radially outwardly projecting positioning means which engage the inner surface of said third passage to center said tube-like member therein in alignment with the aperture of said baffle during insertion of said tube-like member through said aperture.

2. The fitting of claim 1 wherein the area above said baffle which is in communication with said tube-like member and the other of said two passages defines a fluid flow chamber having a top portion closed by a transparent window member, said tube-like member extending through the aperture of said baffle with the upper open end thereof in engagement with said window member, and radially directed apertures in the upper end of said tube-like member for fluid flow to said other passage.

References Cited in the file of this patent

UNITED STATES PATENTS

| | | |
|---|---|---|
| 2,378,632 | Hooker et al. | June 19, 1945 |
| 2,647,633 | Greene | Aug. 4, 1953 |
| 2,753,047 | Kettlewell | July 3, 1956 |
| 2,758,719 | Line | Aug. 14, 1956 |
| 2,873,856 | Jones | Feb. 17, 1959 |

UNITED STATES PATENT OFFICE
CERTIFICATE OF CORRECTION

Patent No. 3,080,977 March 12, 1963

Evan Jones

It is hereby certified that error appears in the above numbered patent requiring correction and that the said Letters Patent should read as corrected below.

Column 4, line 39, after "in-" insert -- clude any ports which must be aligned with any of the --.

Signed and sealed this 19th day of November 1963.

(SEAL)
Attest:

ERNEST W. SWIDER
Attesting Officer

EDWIN L. REYNOLDS
Acting Commissioner of Patents